United States Patent [19]

Provonchee

[11] Patent Number: 4,990,611
[45] Date of Patent: Feb. 5, 1991

[54] AGAROSE PURIFICATION METHOD USING GLYCOL

[75] Inventor: Richard B. Provonchee, Camden, Me.

[73] Assignee: FMC Corporation, Philadelphia, Pa.

[21] Appl. No.: 86,751

[22] Filed: Aug. 17, 1987

[51] Int. Cl.$^5$ .................... C08B 37/12; C07H 1/06
[52] U.S. Cl. .................... 536/127; 536/1.1; 536/2; 536/3; 435/274
[58] Field of Search .................... 536/2, 3, 127, 1.1; 435/274

[56] References Cited

U.S. PATENT DOCUMENTS

| | | | |
|---|---|---|---|
| 2,963,373 | 12/1960 | Monti et al. | 426/575 |
| 3,281,409 | 10/1966 | Blethen | 536/3 |
| 3,335,127 | 8/1967 | Polson | 536/2 |
| 3,362,884 | 1/1968 | Morse | 435/274 |

FOREIGN PATENT DOCUMENTS 1124207  8/1968  United Kingdom ................ 536/127

OTHER PUBLICATIONS

Industrial Gums, Roy L. Whistler, ed., Academic Press, 1959, New York; "Agar" by H. H. Selby et al.; pp. 32–39.
Serevac Laboratories Limited, Agarose Sagarose Product Bulletin; Printed by Barnaby & Tarr Co., Manchester, England (1966).
Russell et al.; Biochim. Biophys. Acta 86:169–174 (1964).

*Primary Examiner*—Ronald W. Griffin
*Assistant Examiner*—Nancy S. Carson
*Attorney, Agent, or Firm*—Mark A. Greenfield; Patrick C. Baker; Richard E. Elden

[57] ABSTRACT

Purified agarose is recovered from agar or impure agarose by dissolving the agar or agarose in a lower alkylene glycol at elevated temperature, cooling the agar- or agarose-containing glycol solution to induce precipitation of a purified agarose product, and recovering the precipitated agarose product.

24 Claims, No Drawings

AGAROSE PURIFICATION METHOD USING GLYCOL

BACKGROUND OF THE INVENTION

The invention relates to the recovery of purified agarose from agar or agarose using a lower alkylene glycol.

Agarose is a neutral galactose polysaccharide obtained from agar. Agar also contains agaropectin, a sulfated polysaccharide considered to be undesirable when present in agarose. Because agarose contains no charged groups, aqueous agarose gels are employed as a medium for electrophoresis and in immunodiffusion.

Several methods are reported in the literature for recovering agarose from agar. U.S. Pat. No. 3,281,409 issued to Blethen is a commercially-used process that uses carrageenan and a quaternary ammonium salt to precipitate the agaropectin component from an agar-containing solution. U.S. Pat. No. 3,362,884 issued to Morse selectively separates the agaropectin from agar by degrading the agaropectin with pectinase to render it water soluble. Even though these procedures selectively remove agaropectin from the agar, the additives used in the separation procedure can remain behind in the agarose-containing fraction as impurities.

This drawback is minimized in the agarose recovery method described by Polson in U.S. Pat. No. 3,335,127, which employs polyethylene glycol to fractionate a purified agarose product from agarose/agaropectin mixtures. Polyethylene glycol is contacted with an aqueous solution containing the impure agarose at elevated temperature to precipitate the purified agarose product. Since water-soluble impurities like color bodies tend to coprecipitate with the agarose in a one pass procedure, the Polson fractionation procedure must be repeated to obtain a high purity product.

The present invention also fractionates a purified agarose product but employs low molecular weight alkylene glycols in a procedure that differs from the approach utilized in Polson's method. In contrast to Polson's use of polyethylene glycol to induce precipitation of agarose from an aqueous agarose solution, the present invention first dissolves the impure agarose into the lower alkylene glycol, and the desired agarose product is thereafter precipitated from the agarose/glycol solution.

Because most impurities remain behind in the glycol in the present invention, the recovered agarose product is exceptionally pure. Another characteristic provided by the present invention is that the recovered agarose product readily dissolves in aqueous solution, without resort to high solution temperatures.

SUMMARY OF THE INVENTION

In accordance with the present invention, a purified agarose is recovered from agar or agarose by the method of dissolving agar or agarose in a lower alkylene glycol at elevated temperature, the glycol being selected from the group consisting of ethylene glycol, diethylene glycol, propylene glycol and trimethylene glycol; cooling the agar- or agarose-containing glycol solution to induce precipitation of a purified agarose product; and recovering the precipitated agarose product.

The glycol solution may optionally contain a small amount of water, less than about 15 wt % water and preferably within the range of 0.5–10 wt % water. In such event, the glycol is preferably propylene glycol or diethylene glycol.

When the glycol used to dissolve the agar or agarose is substantially water-free, the glycol is preferably ethylene glycol or trimethylene glycol.

Dissolution of the agar or agarose in the glycol is preferably carried out at a temperature of about 50°–130° C., more preferably 80°–110° C. when the glycol is ethylene glycol or propylene glycol.

DETAILED DESCRIPTION

This invention is applicable to the treatment of natural or crude agars from various sources, as well as to agars that have been processed or pre-purified to various degrees.

Likewise, agarose may also be employed in the method of this invention, to recover a more highly purified agarose fraction. Such agarose to be treated may be crude or impure, containing a significant level of agaropectin and/or other impurities, or may be a relatively pure agarose, from which an ultra high purity agarose product is sought. It should be noted that low grade agars are typically treated in a preliminary step to remove insoluble matter, before being processed in the method of this invention.

Throughout this disclosure, the term "source agarose" is intended to cover both agarose and agar as the source material being referred to and utilized in this invention.

The source agarose is preferably in particulate form, e.g., a powder, but flake material or the like may also be used. It is not necessary that the source agarose be dry. Wet material in the form of a coagulum or wet cake, containing moisture, alcohol or other glycol-soluble liquid from previous processing steps, may be employed.

Sufficient source agarose should be dissolved in the glycol to provide a glycol solution containing at least about 0.1 wt % agar or agarose. The glycol solution preferably contains at least about 0.5 wt % agar or agarose. Although the glycol solution is desirably concentrated with respect to the dissolved source material to maximize process efficiencies, the high viscosities of concentrated agar- or agarose-containing glycol solutions impose a practical upper limit for workable concentrations, typically around 5–10 wt %.

The glycols suitable for use in this invention are lower alkylene glycols. Suitable lower alkylene glycols include ethylene glycol (1,2-ethanediol), diethylene glycol, propylene glycol (1,2-propanediol) and trimethylene glycol (1,3-propanediol). Other lower glycols may be workable under certain conditions; 1,2-butanediol will dissolve the source agarose provided that small amounts of water are present, in the glycol.

Mixtures of these lower alkylene glycols may also be employed. Mixtures of lower alkylene glycols, e.g., ethylene glycol and propylene glycol containing equal parts of each glycol component, give satisfactory results. Other components or additives may also be present in the glycol if desired, e.g., salts such as sodium chloride or sodium acetate. Such additives may be used to increase the agarose product recovery yield, but agarose purity may be reduced due to the presence of increased levels of agaropectin in the precipitated agarose.

Water, in small amounts, may also be present in the glycol used to dissolve the source agarose. The aqueous glycol should contain less than about 25 wt % water, when water is present. The amount of water is desirably less than 15 wt % water, and more preferably in the range of 0.5–10 wt % water. If higher water contents than these preferred amounts are present in the glycol, then agarose product recovery yields will be less than optimal.

With ethylene glycol or trimethylene glycol as the glycol of choice, the source agarose readily dissolves in the glycol. Such glycols are desirably used in pure form, being substantially water-free.

With propylene glycol or diethylene glycol as the selected glycol, dissolution of the source agarose is enhanced by the presence of small amounts of water in the glycol. The aqueous glycol should contain less than 15 wt % water and preferably contains from about 0.5–10 wt % water. Dissolution of the source agarose is carried out at elevated temperature. The glycol may be heated to the desired dissolution temperature before, during, or after addition of the source agarose.

The dissolution temperature is preferably within the range of about 50°–130° C. Elevated temperatures above 80° C. are more preferred since the amount of source agarose dissolved is increased at such higher temperatures. Excessively high dissolution temperatures, above 150° C., are best avoided because agarose may be degraded by exposure to such high temperatures. When the specified glycol is ethylene glycol or propylene glycol, dissolution is desirably carried out at a temperature of about 80°–110° C.

The source agarose is preferably added gradually to the glycol, to promote rapid dissolution of the agarose without clumping. The length of time for the source agarose to dissolve will depend on the method of addition, on the sizing of the material, on the source agarose itself, and on the dissolution temperature chosen. Dissolution rate is increased, all other factors being equal, with small particle sizing, so powdered or particulate source agarose is preferred over flaked material. Agitation or vigorous mixing of the source agarose in the glycol is also helpful in promoting more rapid dissolution. Higher dissolution temperatures, within the above-noted ranges, usually enhance the dissolution rate.

Once the source agarose has been completely dissolved, the agar- or agarose-containing solution is cooled to induce precipitation of the desired purified agarose product. There is no need for a holding period at the elevated dissolution temperature, and cooling may be begun immediately after complete dissolution has been achieved.

The solution should be cooled to a temperature below about 70° C., preferably below about 50° C. and most preferably below about 30° C. The preferred lower temperatures maximize the recovery yield of purified agarose product. Cooling rate is generally not critical during this precipitation step.

The precipitated agarose product may be recovered from the cooled glycol slurry by conventional means. The precipitate is typically a finely-divided material that may be separated from the glycol solution via filtration, centrifugation, or the like.

The precipitated agarose product is desirably washed, during its recovery, with a volatile organic solvent that is miscible with the glycol and that is a non-solvent for the agarose. The solvent is preferably a lower alkyl alcohol and is preferably selected from methanol, ethanol or isopropanol. The solvent may also be acetone.

Prior to recovery of the precipitated agarose product from the glycol-solids slurry, the slurry may optionally be diluted with an organic solvent, preferably isopropanol but other low boiling point solvents can be used, to facilitate recovery of precipitated solids from the glycol solution. The amount of solvent should be sufficient to thin the slurry; volume ratios of 1:2 to 2:1 slurry:solvent are preferred. The precipitated agarose solids may then be recovered by conventional means, as described earlier. The precipitated agarose solids that are separated from the glycol solution (mother liquor) are generally dried to recover a dry agarose, using conventional drying equipment. The recovered agarose may be washed, as noted above, prior to drying. The dried agarose product may be ground, as necessary, to recover free-flowing agarose powder or particles.

The glycol solution that remains behind after recovery of the precipitated agarose solids is desirably treated to purify the glycol for reuse. Conventional distillation procedures can be employed to separate the isopropanol (if used to enhance recovery yields of the agarose precipitate) and glycol components from the mother liquor.

The portion of source agarose that remains behind in the glycol solution after recovery of the purified agarose product may either be recovered, as a less pure agarose material, or simply discarded. Recovery of the glycol for reuse is ordinarily desirable, and this is carried out by conventional methods, e.g., by dehydrating and fractionating the glycol.

Yields of the precipitated agarose product obtained in the method of this invention are generally good, the exact yield depending on factors such as the source agar/agarose, dissolution temperature, cooling temperature, glycol type and amount of water, if any, present, and optional use of isopropyl alcohol as diluent. Representative yields may range from 30–75%, based on the weight of source agarose or agar. The lower recovery yields typically produce an agarose product of exceptional purity.

The method of this invention may be carried out either batchwise, semicontinuously, or continuously.

The recovered agarose fraction is characterized by having significantly improved purity, as reflected in several of its commonly measured properties, compared to the source agar or agarose. Gel strength is typically much higher. Ash, sulfur and pyruvate contents are reduced, and electroendosmosis (EEO) values are also reduced.

Besides its high purity, the recovered agarose fraction has been discovered to be readily redissolved in aqueous solution, without resorting to high solution temperatures. Before being dried, the precipitated agarose fraction will dissolve rapidly in water at ambient temperature, and such solubilized agarose will eventually gel the solution. After drying, the recovered agarose fraction must be rewet with modest amounts, i.e., about 1%, of isopropyl alcohol or acetone to induce rapid dissolution in water at ambient temperature, around 20°–25° C.

The recovered agarose fraction, before or after drying, may be dissolved in water or aqueous solution at moderate temperatures of about 50°–60° C.; wetting of the agarose with modest amounts of isopropyl alcohol or acetone facilitates such dissolution. By contrast, the source agarose or agar typically requires much higher temperatures, around 100° C., before dissolution can be induced.

The method of this invention may be carried out as described in the following examples, which are not intended to limit the manner in which this invention may be practiced.

EXAMPLE 1

This example utilized propylene glycol as the lower alkylene glycol in the further purification of a commercial agarose; water was added to the glycol used for dissolution of the source agarose. The procedure is laboratory-scale but is amenable to practice on a larger scale.

One liter of propylene glycol was introduced into a two liter beaker equipped with a stirrer and thermometer and placed on a hot plate.

Ten grams of a commercial grade agarose (SeaKem® LE agarose obtained from FMC BioProducts, Rockland, Maine) was added to the glycol, with stirring. The stirred mixture was heated to about 90° C., and 75 ml water was added. Heating was continued to raise the temperature to about 135° C. and to solubilize all of the agarose in the aqueous glycol.

The agarose-containing solution was then removed from heat and allowed to cool to induce formation of an agarose precipitate. When the temperature reached 70° C., one liter of isopropanol (99% $(CH_3)_2CHOH$) was added to the slurry, with stirring. The slurry was then allowed to cool to 20°-25° C., without stirring.

The slurry was then centrifuged. The centrifuge cake, i.e., the agarose precipitate, was washed by resuspending the precipitate in a 50:50 mixture of propylene glycol and isopropanol, thoroughly mixing the slurry, and thereafter centrifuging. This centrifuge cake was washed several times with isopropanol on a Buchner funnel and thereafter dried in a vacuum oven at a temperature of 40° C.

The resulting agarose product, after grinding to remove lumps, was a fine, white powder. Recovery yield of the agarose product, based on the source agarose used, was 61%.

Analysis of the agarose product and of the original source agarose from which it was prepared showed that the gel strength of the agarose product was substantially higher and that its ash content, sulfate content and EEO value had been reduced:

|  | Agarose Product | Source Agarose |
|---|---|---|
| Gel Strength (1% gel, gm/cm$^2$) | 1400 | 1054 |
| Ash (%) | 0.07 | 0.55 |
| Sulfate (% SO$_4$) | 0.07 | 0.16 |
| EEO ($-M_r$) | 0.04 | 0.13 |

EXAMPLE 2

This example utilized ethylene glycol as the lower alkylene glycol in the purification of agar to recover agarose. No water was added to the ethylene glycol. The procedure used in this Example 2 used the same equipment and basic procedures as in Example 1.

Ten grams of a commercially-available agar (Bacto® agar obtained from Difco Laboratories, Detroit, Mich.) was added to one liter of ethylene glycol at ambient temperature. The mixture was heated to 105° C. and maintained at this temperature for one hour, which was sufficient time for all of the agar to dissolve.

The agar-containing solution was removed from heat and allowed to cool, during which time a fine precipitate formed. The slurry was placed in a freezer at −20° C. overnight, which caused the formation of additional precipitate.

One liter of chilled (−20° C.) isopropyl alcohol was added to the slurry; the mixture was then stirred for two hours and then returned to the freezer overnight.

The following day, the slurry was resuspended by stirring and then centrifuged. The centrifuge cake was washed twice with isopropyl alcohol, before being dried in a hot air oven at 55° C.

The resulting agarose product was a fine, free flowing white powder. Recovery yield of the agarose product, based on the source agar used, was 21%.

Analysis of the agarose product and of the source agar showed that the gel strength of the agarose product was substantially higher and that its ash content and sulfate content had been reduced:

|  | Agarose Product | Source Agar |
|---|---|---|
| Gel Strength (1% gel, gm/cm$^2$) | 937 | 200 |
| Ash (%) | 1.05 | 4.06 |
| Sulfate (% SO$_4$) | 0.68 | 3.15 |
| EEO ($-M_r$) | 0.21 | not done |

I claim:

1. A method for recovering a purified agarose from agar or agarose which comprises dissolving agar or agarose in a lower alkylene glycol at elevated temperature but below the decomposition temperature of the agar or agarose, the glycol being selected from the group consisting of ethylene glycol, diethylene glycol, propylene glycol and trimethylene glycol;

cooling the agar- or agarose-containing glycol solution to a temperature effective to induce precipitation of a purified agarose product; and recovering the precipitated agarose product.

2. The method of claim 1 wherein the agar or agarose is dissolved in the glycol in the presence of a small amount of water, the aqueous glycol containing less than about 15 wt % water.

3. The method of claim 2 wherein the glycol contains from about 0.5-10 wt % water.

4. The method of claim 2 wherein the glycol is selected from propylene glycol and diethylene glycol.

5. The method of claim 1 wherein the glycol used to dissolve the agar or agarose is selected from ethylene glycol and trimethylene glycol and such glycol is substantially water-free.

6. The method of claim 1 wherein sufficient agar or agarose is dissolved in the glycol to form a glycol solution containing at least about 0.1 wt % agar or agarose.

7. The method of claim 6 wherein the glycol solution contains at least about 0.5 wt % agar or agarose.

8. The method of claim 1 wherein dissolution of the agar or agarose into the glycol is carried out at an elevated temperature of about 50°-130° C.

9. The method of claim 1 wherein the glycol is ethylene glycol or propylene glycol and dissolution of the agar or agarose into the glycol is carried out at a temperature of about 80°-110° C.

10. The method of claim 1 wherein the agar- or agarose-containing glycol solution is cooled at least 10° C. below the temperature at which the agar or agarose dissolves, to induce precipitation of the purified agarose product.

11. The method of claim 1 wherein the agar- or agarose-containing glycol solution is cooled to a temperature below 70° C. to induce precipitation of the purified agarose product.

12. The method of claim 11 wherein the agar- or agarose-containing glycol solution is cooled to a temperature below 50° C. to induce precipitation of the purified agarose product.

13. The method of claim 12 wherein the agar- or agarose-containing glycol solution is cooled to a temperature below 30° C. to induce precipitation of the purified agarose product.

14. The method of claim 1 wherein the glycol is a mixture of glycols.

15. The method of claim 14 wherein the glycol is a mixture of ethylene glycol and propylene glycol.

16. The method of claim 1 wherein the agar or agarose to be dissolved in the glycol is in particulate form.

17. The method of claim 1 wherein the agar or agarose to be dissolved in the glycol is in the form of a coagulum.

18. The method of claim 1 wherein the precipitated agarose product is recovered by centrifugation or filtration.

19. The method of claim 1 wherein the precipitated agarose product is washed, during its recovery, with a volatile organic solvent that is miscible with the glycol and that is a non-solvent for the agarose.

20. The method of claim 19 wherein the solvent is a lower alkyl alcohol.

21. The method of claim 20 wherein the solvent is selected from methanol, ethanol and isopropanol.

22. The method of claim 19 wherein the solvent is acetone.

23. The method of claim 1 wherein the precipitated agarose product in glycoil solution is diluted with isopropanol prior to recovery to facilitate recovery of the precipitated product.

24. The method of claim 1 wherein the recovered agarose product is dried.

* * * * *